United States Patent [19]
Chilcote

[11] Patent Number: 5,645,014
[45] Date of Patent: Jul. 8, 1997

[54] MODULAR PET HABITAT

[76] Inventor: Stefan Chilcote, 3841 4th Ave., Ste. 194, San Diego, Calif. 92103

[21] Appl. No.: 489,853

[22] Filed: Jun. 13, 1995

[51] Int. Cl.⁶ .................................................. A01K 1/00
[52] U.S. Cl. .............................. 119/498; 119/482; 52/581
[58] Field of Search ......................... 119/482, 484, 119/496, 498, 499, 501; 52/581, 589.1, 800.1, 800.12

[56] References Cited

U.S. PATENT DOCUMENTS

| | | | |
|---|---|---|---|
| 2,560,661 | 7/1951 | Poovey | 119/501 X |
| 4,301,766 | 11/1981 | Piccone | 119/482 |
| 4,421,058 | 12/1983 | Paul | 119/484 |
| 4,967,530 | 11/1990 | Clunn | 52/800.12 X |
| 5,097,643 | 3/1992 | Wittler | 52/581 X |
| 5,519,971 | 5/1996 | Ramirez | 52/589.1 X |

*Primary Examiner*—Robert P. Swiatek
*Assistant Examiner*—Elizabeth Shaw
*Attorney, Agent, or Firm*—The Kline Law Firm

[57] ABSTRACT

A modular pet habitat specifically adapted to accommodate cats. The device includes multiple panels which are linked together in variable conformations to create a maze through which the cat can travel. Connectors that allow the user to snap panels together by hand, without the use of tools, allow easy construction and modification of the habitat.

2 Claims, 7 Drawing Sheets

5,645,014

MODULAR PET HABITAT

FIELD OF THE INVENTION

The present invention relates generally to pet accessories, and more particularly is a modular habitat for cats.

BACKGROUND OF THE INVENTION

There are a great many products directed to pets. They range from items such as food and dietary supplements to clothes and playthings. One of the difficulties in keeping a pet indoors is to keep the pet interested in its own playthings so as to minimize wear and tear on the pet owner's belongings.

One of the most popular pets, second only to dogs as the pet of choice, is cats. Cats require constant stimulation to hold their interest, and so there are a multitude of products directed at entertaining cats and occupying their time. There are balls, scratching posts, etc.

However, to date there has been no means of constructing a living area for a cat that can be constantly changed and updated to continually take on new conformations, and thereby provide an area of exploration for a pet, and particularly a cat.

OBJECTS, SUMMARY, AND ADVANTAGES OF THE INVENTION

Accordingly, it is an object of the present invention to provide a means whereby a pet's living area can be continually modified to maintain a pet's interest.

It is another object of the present invention to provide a means to allow these modification to be made quickly and easily, without the use of tools.

The present invention is a modular pet habitat, and is specifically adapted to accommodate cats. The device comprises multiple panels which are linked together in variable conformations to create a maze through which the cat can travel. Connecting means that allow the user to snap panels together by hand, without the use of tools, allow easy construction and modification of the habitat.

An advantage of the present invention is that the user can continually reconstruct the habitat to keep the pet's interest.

A further advantage; of the present invention is that it can be constructed to utilize any available space.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
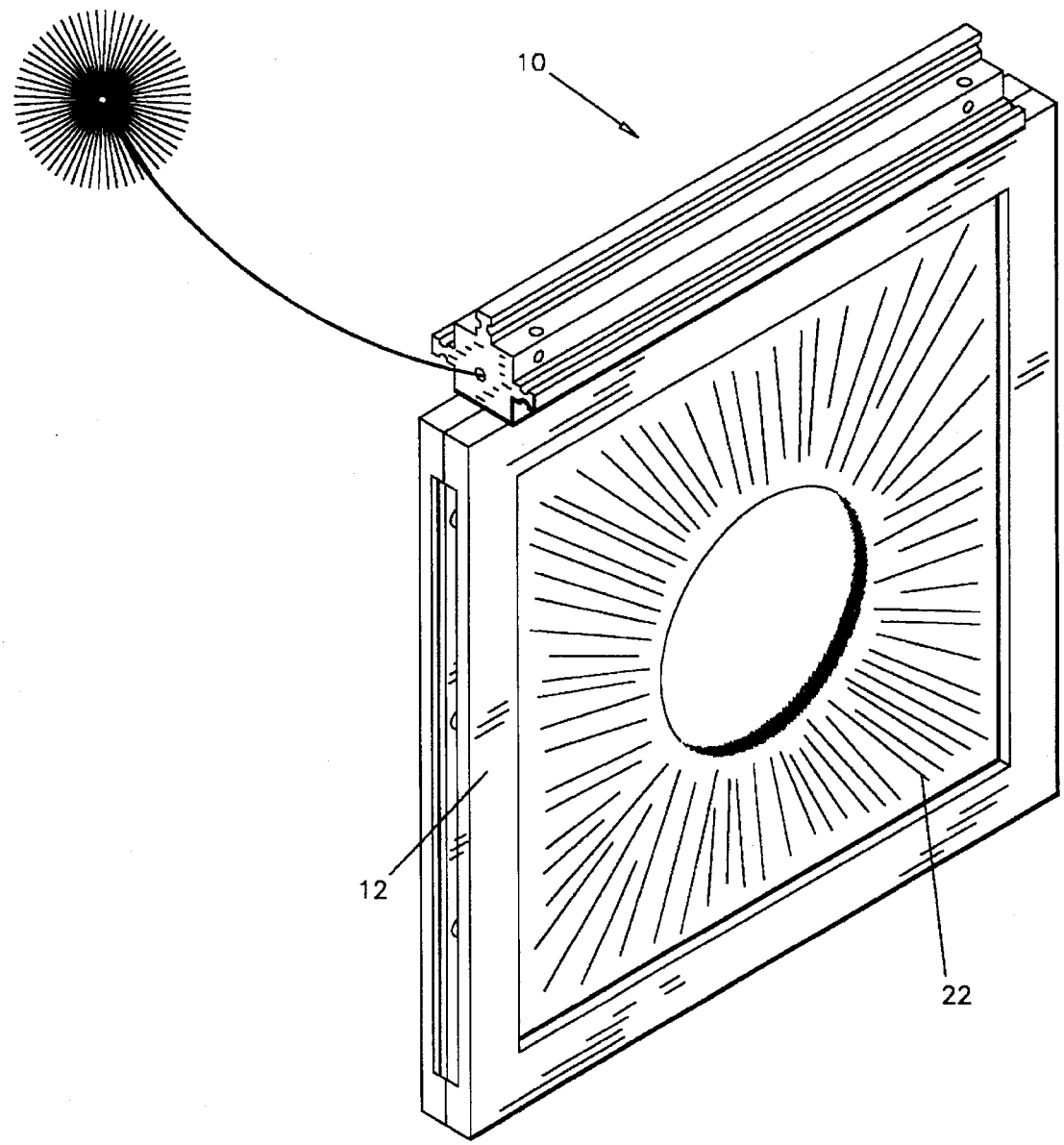
FIG. 1 is a perspective view of the basic panel frame of the present invention.
Figure 2:
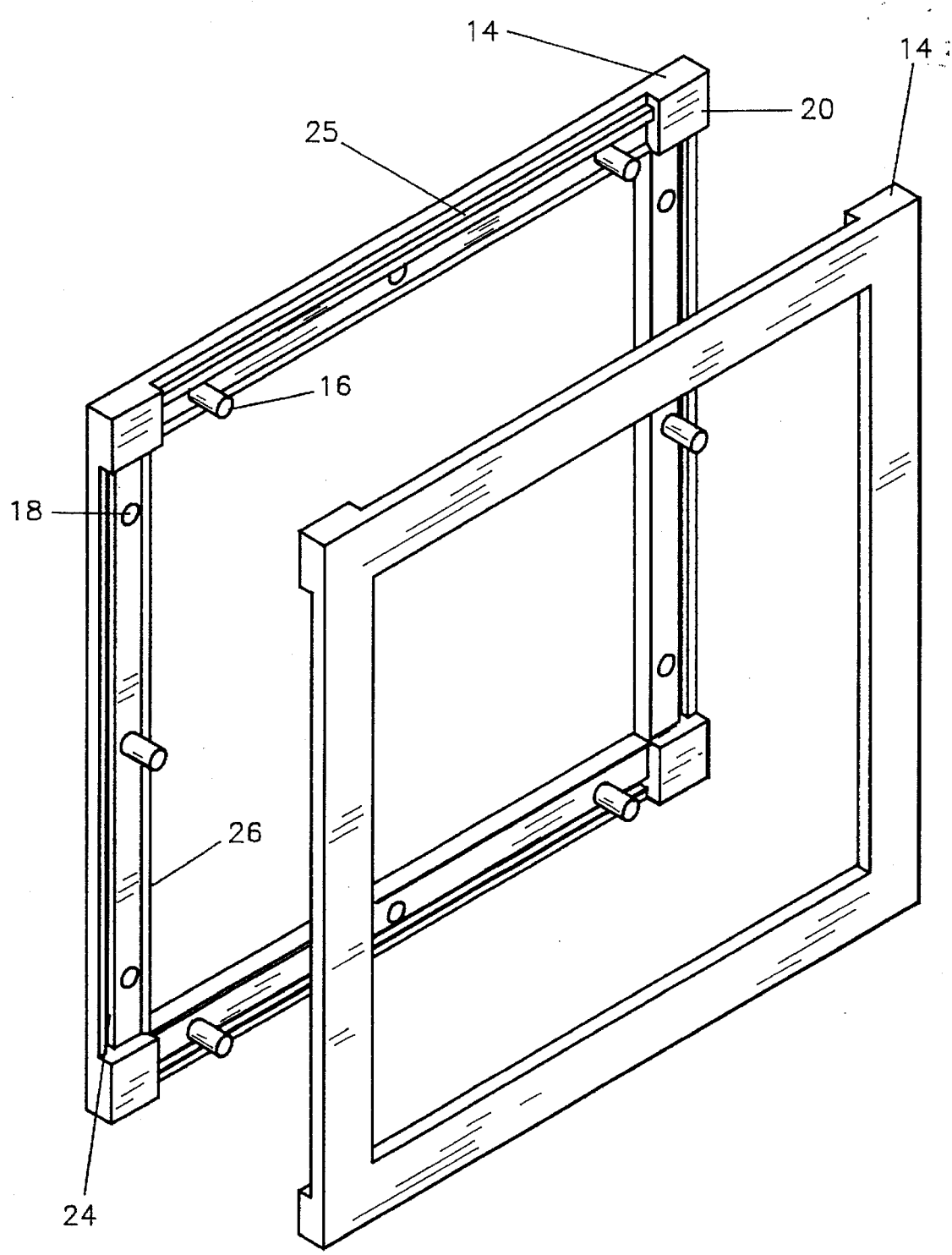
FIG. 2 is a perspective view of the basic panel frame of the present invention with the two panel elements separated.

The present invention is a modular pet habitat. The habitat is formed from a plurality of panels 10. The panels 10 are enclosed in a panel frame 12, illustrated in FIG. 1. The panel frame 12 comprises two frame elements 14 which are shown in FIG. 2. The frame elements 14, snap together by means of pegs 16 which are friction fit into peg receiving holes 18 spaced along the perimeter of the frame element 14.

Raised corner projections 20 ensure the proper spacing between the frame elements 14. The spacing is required to accommodate the receiving and securing of the various inserts 22, shown in FIGS. 9–13. (The inserts 22 will be described in greater detail below.)

Figure 3A:
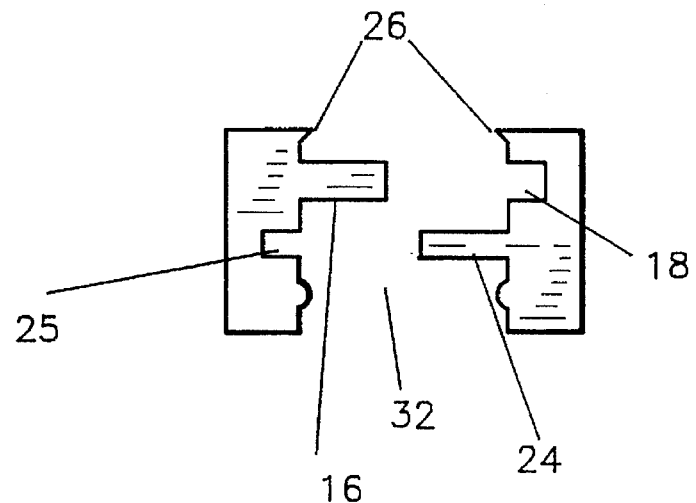
FIGS. 3A and 3B are cross sections of the panel frame elements.
Figure 3B:
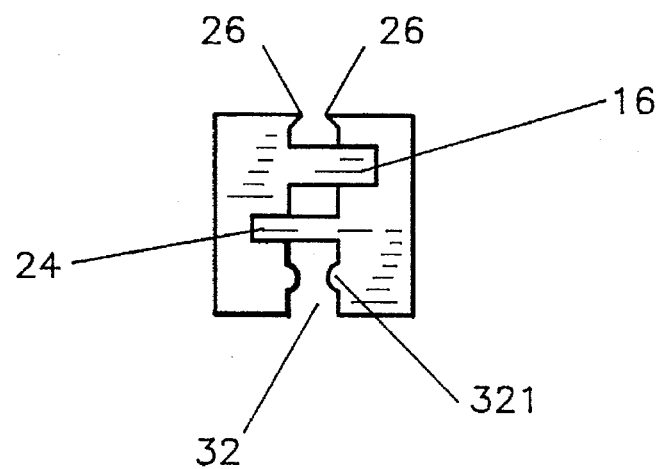

The means whereby the inserts 22 are secured within the frame 12 can be seen in FIGS. 3A and 3B. The inserts 22 are held at the proper position within the panel frames 12 by a protruding insert positioning rib 24 which extends axially around alternating interior sides of the frame elements 14. The interior sides of the frame elements without the rib 24 include a receiving slot 25. The rib 24 extends from the plane of the frame element 14 at a position so that an outer edge of an insert resting upon the positioning rib 24 will be centered within the panel frame 12. A securing rib 26, which tapers to a pointed interior edge 28, grips the insert 22 to hold it firmly in position.

Multiple panels 10, each panel comprising an insert 22 secured within the frame 12, are joined together by connector elements 30, which are depicted in more detail in FIGS. 4–8.

The connector elements 30 each comprise a central body 301 with from one to four projecting couplers 302. The couplers 302 have the same profile as an outer channel 32 of the panel frame 12. (See FIG. 3B.) Depressions 303 in a central area of the coupler 302 mesh with projections 321 in the outer channel 32. This ensures a secure fit after the connector elements 30 are inserted into the channel 32.

Toy mounting holes 304 are provided in the central body 301 so that cat toys 34 may be affixed to the panels 10.

Figure 4:
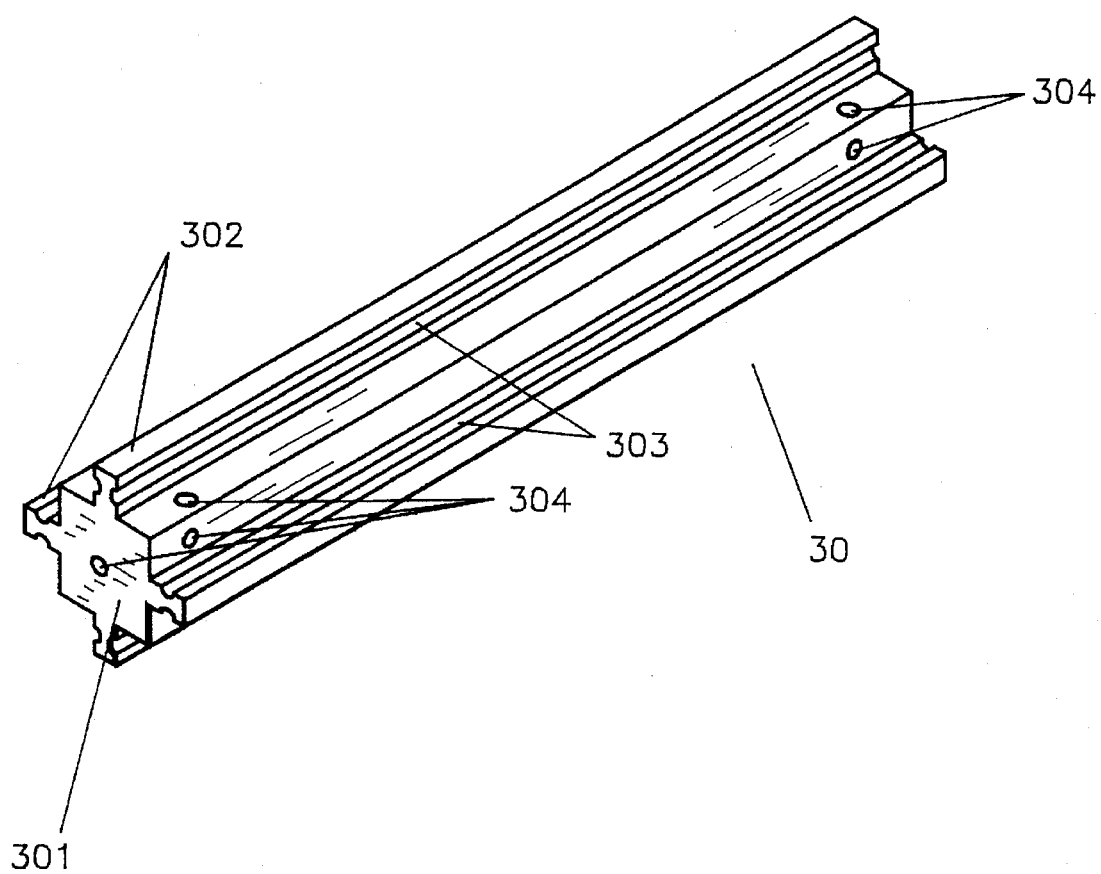
FIG. 4 is a perspective view of a connector element.
Figure 5:
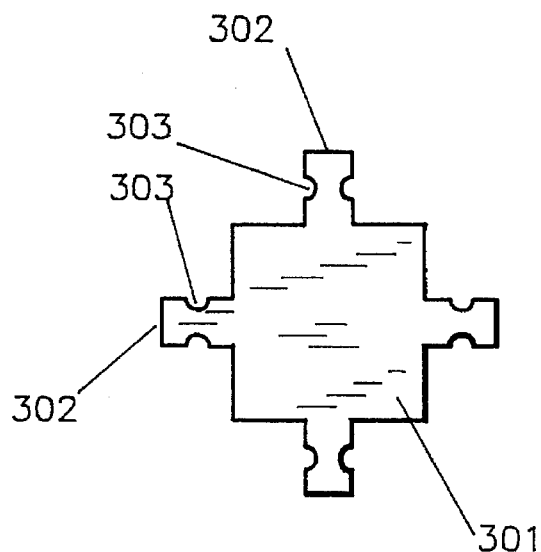
FIGS. 5–8 show cross sections of four different connector elements.
Figure 6:
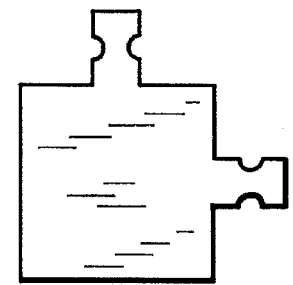
Figure 7:
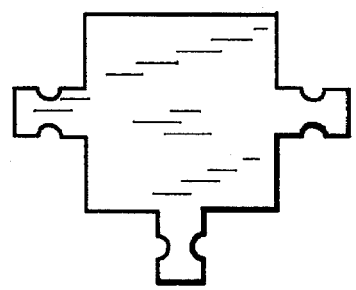
Figure 8:
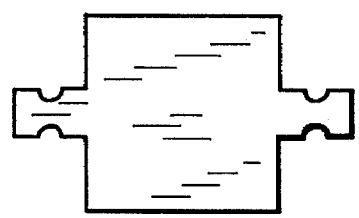
Figure 9:
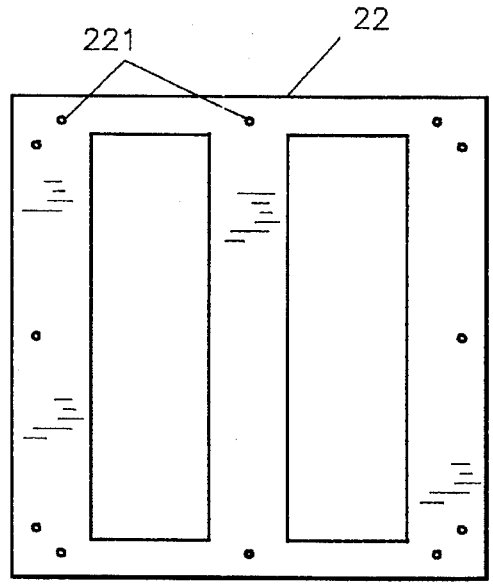
FIGS. 9–12 show some of the inserts available for the panel frames.
Figure 10:
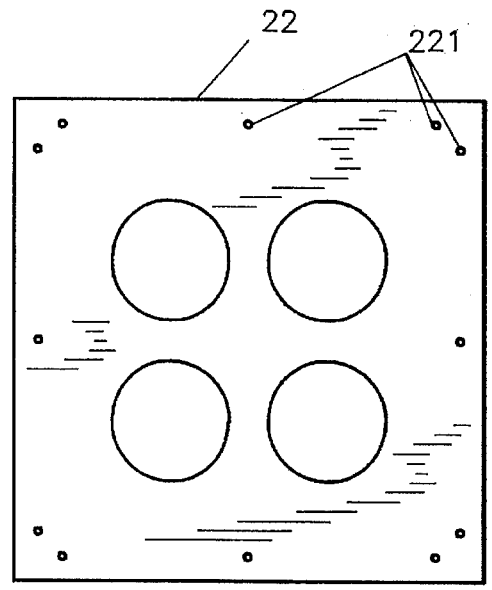
Figure 11:
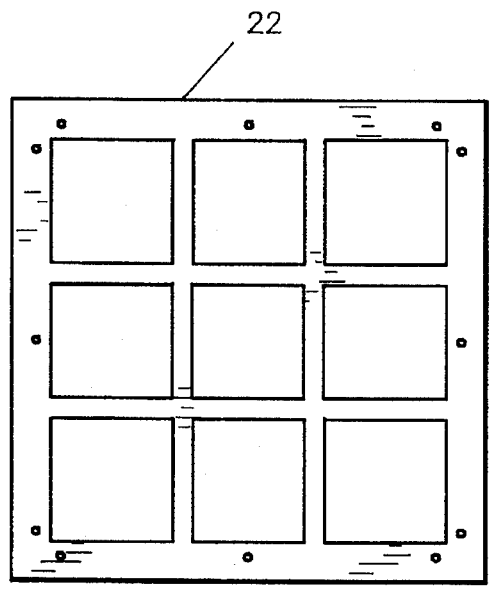
Figure 12:
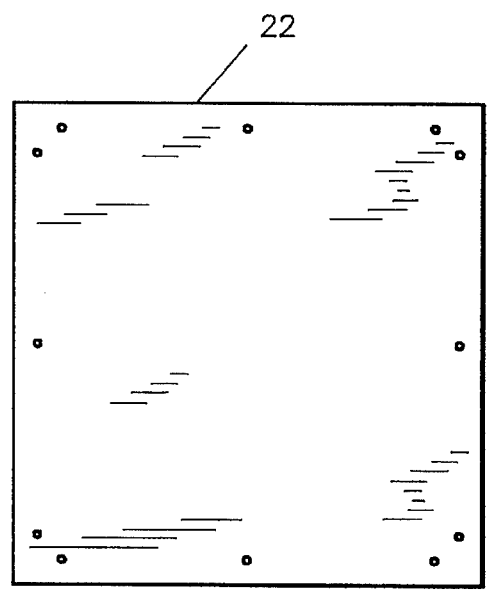
Figure 13:
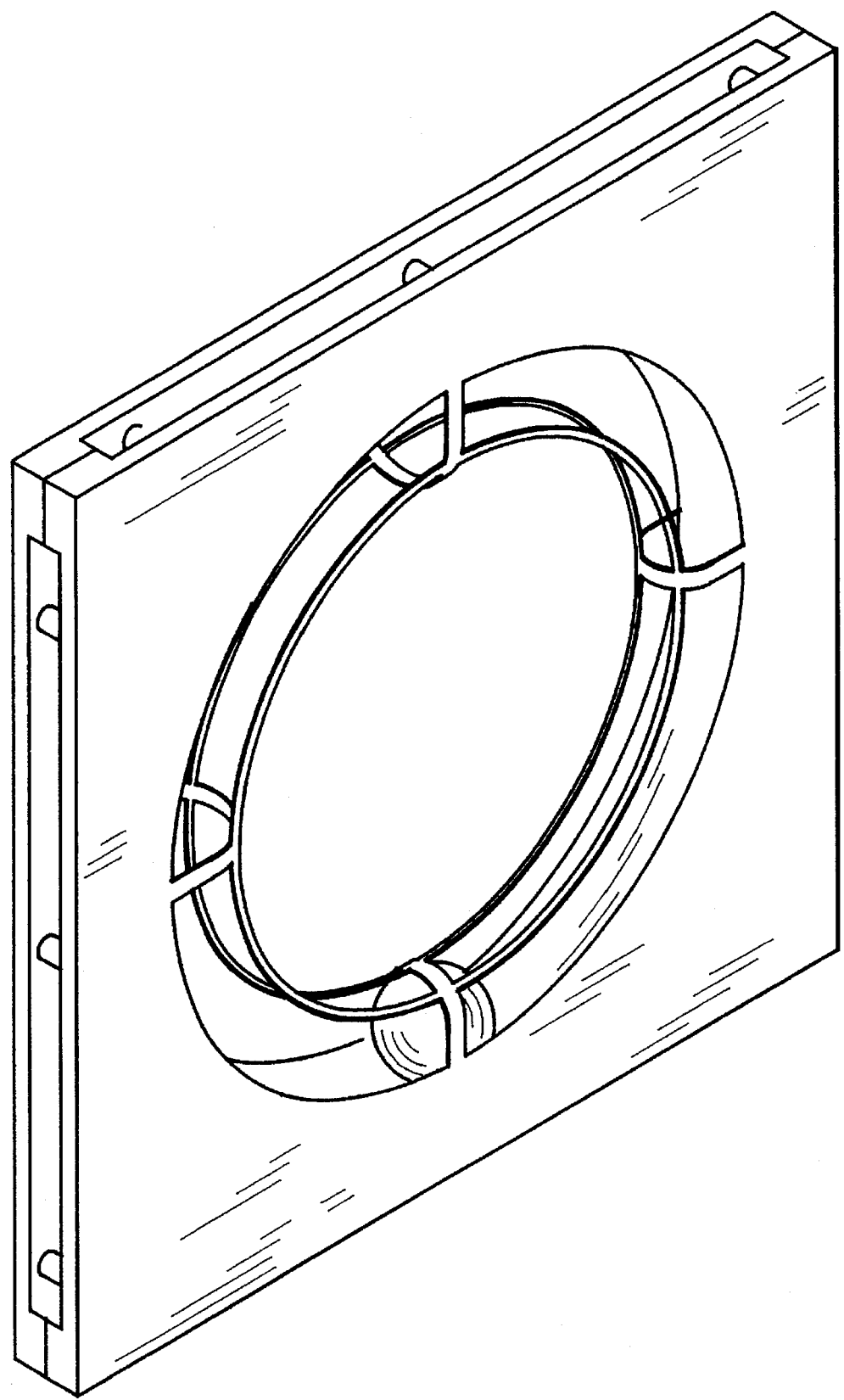
FIG. 13 illustrates a particular exercise conformation for an insert for a panel frame.

Depending upon the conformation desired by the user, the connectors 30 may have any of the cross sections depicted in FIGS. 5–8. FIGS. 4 and 5 depict a four-way connector, used to join four panels 10. FIGS. 6–8 show respectively a two-way corner connector, a three-way connector, and a straight-line connector. The four-way connectors could of course be used in all instances, but four-way connectors would leave exposed couplers at any junctions where less than four panels were being joined.

The inserts 22, some of which are shown in FIGS. 9–13, are used to vary the structure of the habitat, and to provide changeable play areas for the cats. The inserts 22 each have three holes 221 along each of their sides. The holes 221 fit over the pegs 16 in the frame elements 14. This ensures that the inserts 22 will not slip within the frame 12.

Construction and use of the present invention is as follows: The user assembles a panel by selecting two panel frame elements 14. An insert 22 is installed on one of the frame elements 14, with the holes 221 in the insert aligning on the pegs 16 of the frame elements 14. The insert rests on the positioning rib 24 to minimize stress on the holes 221.

The second frame element 14 is then rotated 90° relative to the first element, and snapped together with the first. The pegs 16 of the second element are received in the holes 18 of the first, and vice versa. Similarly, the ribs 24 are received into the slots 25. Also, the securing rib 26 is now clamped onto the insert 22 to further ensure that the insert remains in the proper position.

The user continues in this manner until he has assembled as many panels 10 as he desires. The panels 10 are then joined by connectors 30 into whatever conformation the user chooses. Since the connectors allow the panels to be joined without the use of tools, assembly is quick and easy. Further, the user can change the arrangement of the panels as often as he likes for the amusement of the cats.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A modular pet habitat comprising:

a plurality of panels, each of said panels includes a panel frame and an insert, said panel frame includes means to secure said insert, said panel frames comprise two frame elements, each said element including around its perimeter on an interior side an alternating series of pegs and holes, the panel frames further including an axial, angled securing rib on each interior side of said frame element, and an axial positioning rib at a central section of alternating interior sides of the panel frame; such that when a first frame element is rotated 90° relative to a second frame element, the pegs of the first element align with the holes of the second element, thereby creating a friction fit of the two frame elements, securing them together and connecting means adapted to allow a user to connect said panels together in various conformations, the connections being accomplished without the use of tools.

2. The habitat of claim 1 wherein:

said connecting means comprise connectors including a central body with couplers on at least two sides thereof, said couplers including means to mesh with a channel in said panel frame.

\* \* \* \* \*